United States Patent Office 3,329,741
Patented July 4, 1967

3,329,741
PROCESS FOR PREPARING RUBBERY POLYMERS WITH A CATALYST COMPRISING Ti(OR)₄
Albert Schrage, East Orange, N.J., and Emory J. Pless, Brooklyn, N.Y., assignors to Rexall Drug and Chemical Company, Los Angeles, Calif., a corporation of Delaware
No Drawing. Filed May 8, 1963, Ser. No. 279,017
15 Claims. (Cl. 260—878)

This invention relates to a process for preparing high molecular weight amorphous or rubbery polymers and it relates more specifically to a novel process for polymerizing alpha-olefins to polymers containing a high proportion of amorphous or rubbery content. Certain rubbery polymers and copolymers prepared by the process herein are completely soluble in certain hydrocarbons.

In Belgian Patent 538,782, there is disclosed the production of high molecular weight regular head-to-tail polymers of alpha-olefins which consist of mixtures of sterically differentiated macromolecules having different structures. The crude polymerizates obtained by using titanium tetrachloride or vanadium chloride with metal alkyls such as aluminum triethyl as catalysts for the polymerization are shown to contain the so-called isotactic and atactic forms of molecular structure as well as large amounts of undesirable liquid (oily) low molecular weight polymers. The different forms or types of polymers can be isolated by fractional dissolution according to the teachings of said patent.

In Belgian Patent 543,259, there is further described the employment of certain titanium and aluminum catalyst components which enable the steering of the polymerization to the production of predominantly either the isotactic or crystallizable polymer form or the non-crystallizable or amorphous form.

In this latter patent, it is shown for example that when propylene polymerization is conducted in the presence of alkyl titanates and aluminum triethyl that major amounts of oily polymers are obtained along with minor amounts of amorphous polymer and traces of crystalline material. The reaction rates are low as well as conversions, thereby requiring long polymerization times.

U.S. Patent 3,061,600 is another prior art reference relating specifically to the preparation of alpha-olefin polymers containing a high proportion of amorphous polymer. This patent relates to the modification of the highly stereospecific two-component catalyst systems described in Belgian Patent 543,259 so that alpha-olefin polymers, for example, polybutene, can be prepared, according to the teachings therein, containing a major proportion of an amorphous content.

In the prior art references hereinabove indicated, rubbery or amorphous polymers of alpha-olefins can be prepared, but only at the expense of catalytic efficiency deterioration or the accompaniment of large undesired low molecular weight oily polymers which ordinarily have to be removed from the desired rubber polymer. Rubbery polymers of alpha-olefins, whether they be homo- or rubbery copolymers, for example, find use as substrates for graft polymerization (by peroxide catalysis) or other applications known in the art.

It is an object of this invention to provide a process for preparing high molecular weight rubbery polymers of alpha-olefins.

It is a further object of this invention to provide a process for preparing copolymers of alpha-olefins which are high molecular weight rubbery materials.

It is a further object of this invention to prepare block copolymers wherein an isotactic polymer or other alpha-olefin polymer is modified by inclusion therein of an amorphous rubbery polymer of copolymer fraction by employing specific three-component catalysts to be described herein.

It is a further object of this invention to provide efficient catalysts for the polymerization of alpha-olefins to high molecular weight rubbery materials.

In accordance with the foregoing, it has been found that very highly stereospecific catalyst systems for alpha-olefin polymerizations, such as titanium trichloride activated with an aluminum trialkyl, a dialkyl aluminum hydride or a dialkyl aluminum monochloride can be modified in behavior by the incorporation of a third component, namely a titanium oxyhydrocarbon and that the resulting three-component catalysts when used in catalytic quantities are highly useful in preparing alpha-olefin polymers of high molecular weight and containing high proportions of rubbery polymers. More specifically, the process of this invention utilizes a catalyst prepared by first pre-reacting titanium trichloride with an aluminum compound and thereafter incorporating to said pre-reacted highly stereospecific catalyst system a titanium oxyhydrocarbon in certain preferred mole ratios to be more fully explained hereinafter.

The novel polymerization catalysts employed in the process of this invention produce high molecular weight rubbery polymers, while at the same time, in the majority of applications, increasing the rate of polymerization over the known two component catalyst systems and decreasing molecular weight in a desired manner, all of which properties of this catalyst could not have been determined beforehand from present knowledge with respect to the two component catalyst system. The catalysts employed in the novel process of this invention are represented generally by the system: $Ti(OR)_4:TiCl_3$:aluminum compound and are more fully described and claimed in copending application filed even date herewith, the disclosure of which is incorporated herein by reference.

Specifically, copending application, Serial Number 279,016, filed even date now U.S. Patent 3,226,336 issued December 28, 1965 herewith describes the preparation of the catalyst for use herein by the steps comprising (1) pre-reacting a titanium trichloride with an aluminum trialkyl, a dialkylaluminum hydride or with a diethylaluminum monochloride and after this reaction, which can occur in a hydrocarbon diluent such as heptane (or aromatic hydrocarbons or mixtures thereof), (2) adding the titanium oxyhydrocarbon. In a preferred embodiment of the invention described in said copending application, certain critical ratios for the three-component catalyst system: $Ti(OR)_4:TiCl_3:AlR_nX_{(3-n)}$ are from 0.25 to 1:1:2, except where diethylaluminum monochloride is the third component in which case, the ratios can be 0.25 to 1:1:1 to 8 or higher.

In the three-component catalyst system represented by the system $Ti(OR)_4:TiCl_3:AlR_nX_{(3-n)}$, the following is applicable. In the formula $Ti(OR)_4$, R represents a hydrocarbon such as an alkyl radical of from 2 to 10 carbon atoms. R can also be an aryl radical such as phenyl or an alkenyl, cycloalkyl or cycloalkenyl. The preferred radical is an alkyl as designated.

The $TiCl_3$ component can be $n_1 TiCl_3 \cdot MCl n_2$, where $n_1$ is a number of from 1 to 5, M is a metal such as magnesium, zinc or aluminum (Group II Metals of the Periodic Table according to Mendeleef) and $n_2$ is a number representing the valence of the metal M. A preferred component is $n TiCl_3 \cdot AlCl_3$ where $n$ is a number of from 1 to 5.

In the component $AlR_n X_{(3-n)}$, R is an alkyl radical of from 1 to 10 carbon atoms, X is halogen or hydrogen and $n$ is a number of from 2 to 3. The preferred components are aluminum triethyl, dialkylaluminum hydrides and diethylaluminum monochloride. To simplify the description of the process of this invention, reference will be made hereinafter to tetrabutyl titanate and tetraoctyl titanate as the preferred $Ti(OR)_4$ catalyst components; $3TiCl_3 \cdot AlCl_3$ as the preferred titanium trichloride component and aluminum triethyl, diisobutyl aluminum hydride and diethylaluminum monochloride as the preferred aluminum compound components. The amount of three-component catalyst useful in polymerization reactions is not critical. Thus, from .01 to 10 weight percent catalyst based on the diluent present can be used depending on the pressures used in carrying out the reactions. Lower or higher amounts can also be used, however.

The three-component catalyst systems have been found to be extremely versatile and useful in polymerizing alpha-olefins to solid high molecular weight rubbery polymers with the added advantage, as hereinbefore indicated, of preponderantly increasing the rate of polymerization over the highly efficient two component catalyst systems known for preparing high isotactic or crystalline content containing polymers. Moreover, the three-component catalyst systems surprisingly effect a molecular weight reduction so that polymers of suitable intrinsic viscosities are prepared, while at the same time, resulting in minimum or no low molecular weight oily fractions. If desired, however, hydrogen in amounts of, for example, 1 to 10 mole percent can be used where lower melt viscosities of these polymers are desired.

In alpha-olefin polymerizations, specifically those of from 2 to 10 carbon atoms, employing the novel process of this invention, there are obtained high molecular weight rubbery polymers containing a high proportion of atactic or amorphous content. Polypropylene, for example, as will be illustrated in the examples, has been prepared with up to 64% atactic content, while a completely soluble (in cold xylene) polybutene has been prepared. Higher alpha-olefin polymers can also be prepared in soluble form, for example, polypentene, polyhexene and poly-alpha-olefins containing up to 10 carbon atoms.

The versatility of the catalysts for use in the process of this invention enables the copolymerization of at least two alpha-olefins of a different number of carbon atoms to prepare rubbery copolymers such as ethylene-propylene, ethylene-butene, etc., which are substantially completely soluble in cold xylene. Ordinarily, titanium trichloride and diethylalumnium monochloride or aluminum triethyl yield ethylene-propylene or ethylene-butene rubbers which are only 75 to 85% soluble. A completely soluble rubbery butene-1 polymer or rubbery copolymers prepared with titanium containing catalysts, has not, to our knowledge, been known heretofore.

According to the process of this invention, it has been found that three-component rubbery terpolymers can be prepared with a solubility in cold xylene of up to 97%. This is accomplished in the preferred embodiment of this invention by first prepolymerizing butene-1 to a preferred level of about 6 to 12% of polybutene based on the total weight of the terpolymer and thereafter copolymerizing an ethylene-propylene mixture onto the polybutene to obtain a 97% soluble three-component rubbery terpolymer. Without this prepolymerization step, an ethylene-propylene rubber can only be prepared to a 90% soluble figure.

In a still further preferred embodiment of this invention, a highly improved and desirable process is provided for preparing block copolymers of alpha-olefins, such as propylene, followed by rubbery homopolymers or copolymers of ethylene-propylene, ethylene-butene or propylene-butene. In this embodiment of the invention, propylene which is a typical monomer for this process is first polymerized with a two component catalyst system as known in the prior art, that is, a titanium trichloride and diethylaluminum monochloride, or dialkylaluminum hydride or triethylaluminum to a high molecular weight solid substantially crystalline polymer and thereafter, to the reaction vessel, there is added the third component of the catalyst system, the tetrabutyl titanate or tetraoctyl titanate in the molar ratios heretofore indicated and polymerization is continued by introducing a second monomer, such as ethylene or monomer mixtures such as ethylene-propylene, ethylene-butene or propylene-butene and a rubbery homopolymer or copolymer is formed. This procedure at once enables efficient operation in that the only requirement in this process is the addition of a third catalyst component to the polymer containing active two component catalyst residues in the molar ratios heretofore indicated. It is not known what reaction occurs upon the addition of the third catalyst component, although no deactivation occurs and the polymerization can be continued forming in situ a rubbery polymer either chemically reacted with the crystalline polypropylene, or in such an intimate physical blend that all the good properties of prior art block copolymers are indeed retained by this technique. The added novel characteristics of the rubbery copolymers of this invention, that is, their high molecular weight and substantially no molecular weight oily polymers, as well as their controlled melt viscosity, enables at once preparation of block copolymers possessing the advantages of the rubbery system, as well as those of the crystalline homopolymer. In a commercial operation, therefore, where it is desired to prepare either a homopolymer or a block copolymer, depending on the demand, it is thus only necessary in any polymerization reaction to meter in the required quantities of third component catalyst and prepare at will either of said polymers. The specific examples to be presented hereinafter will illustrate the foregoing modifications of the process of this invention.

In the homopolymerization of alpha-olefin monomers hereinafter referred to as propylene and butene-1, the polymerization can be carried out using either the monomers in liquid form by the application of suitable pressures and temperatures or in the presence of inert diluents, specifically hydrocarbons of the paraffinic type containing from 3 to 10 carbon atoms or more. Aromatic diluents can also be used, for example, xylene or others such as diesel oils. The polymerization reaction is carried out at temperatures of from 40° to 100° C. and in the event of the use of hydrocarbon diluents such as heptane or hexane, at pressure of from atmosphere to 75 p.s.i.g.; where the monomer is used as its own dispersant in liquid form, pressures of at least 150 p.s.i.g. to 750 p.s.i.g. or up to 10,000 p.s.i.g. can be used. A measure of the solubility of the homopolymers prepared can be determined by the use of cold xylene or boiling n-heptane.

In the alternate embodiment of this invention, where rubbery copolymers of alpha-olefins are prepared, the following are proportions to be employed. For ethylene-propylene, the mole ratios of each respectively should be 1 to 10 for ethylene; and 10 to 1 for propylene; with comparable mole ratios for ethylene-butene-1 and propylene-butene-1. Comparable monomer concentrations or mole ratios can be employed for higher alpha-olefins or for copolymers of higher alpha-olefins. Thus, 4-methyl-pentene-1, as well as other branched alpha-olefin monomers, can likewise be copolymerized or, as a matter of fact, homopolymerized as above in accordance with the process herein.

The copolymerization reactions are preferably carried out in inert hydrocarbon diluents such as paraffinic hydrocarbons containing from 3 to 10 carbon atoms represented by propane, pentane, butane, hexane, heptane, octane, etc. Using the foregoing monomer mole ratios, conversions of from 5 to 30 percent can be carried out in a reactor at temperatures of from 40° to 100° C. and pressures as heretofore described for homopolymerizations.

To prepare a more highly soluble rubbery copolymer or terpolymer, this invention provides for the prepolymerization of one of the monomers to a preferred amount, for example, 6 to 12% for butene-1 to polybutene followed by copolymerization of at least one other monomer other than butene onto the formed prepolymer. Copolymer and terpolymer rubbers prepared in such a system are over 90% and up to 97% soluble in cold xylene.

In the further embodiment of the process of this invention herein, the block copolymer preparation can be carried out by any of a number of techniques. Taking propylene as illustrative of the alpha-olefin monomers or butene-1, such monomer can be polymerized to a high isotactic content using titanium trichloride and an aluminum alkyl, for example, triethylaluminum, dialkylaluminum hydride or diethylaluminum monochloride in a solvent or using the monomer in liquid form, the conditions described above for homopolymerization of alpha-olefins being applicable to the initial homopolymerization of propylene or butene-1 to the high isotactic content type material. The block polymerization or copolymerization can be carried out in a diluent or in the dry phase by removal of solvent by adding the alkyl titanate as the third component to the living polymer already containing active two component catalyst residues and conducting the polymerization by introducing one or more alpha-olefin monomers to the reaction zone at pressures of from one atmosphere to as high as 150 p.s.i.g. and temperatures as heretofore indicated, while providing adequate agitation. Where the block copolymerization is carried out in a diluent, temperatures of from 40° to 100° C. can be used. The mole ratios of the monomer or comonomers introduced to form the rubbery block copolymer can range in the case of comonomers exemplified by ethylene-propylene as discussed above for the rubbery copolymer systems. The amount of rubbery homo- or copolymer which can be introduced onto the polypropylene or polybutene can range from 5 to 40% or higher. Polypropylene so modified has certain specific advantages over the crystalline homopolymer, such as improved Izod impact strengths and low temperature brittleness properties.

In order that the process of this invention can be more fully understood, reference is made to the following examples which are illustrative hereof.

In the examples which follow which illustrate polymerization reactions, unless otherwise indicated, the reaction was carried out in heptane as a diluent at 60° C. and at atmospheric pressure in a two liter reactor. Monomer gases were fed into the reactor in excess of the amount absorbed and reacted. Reaction times were about four (4) hours, except where the reaction was terminated earlier. The polymers formed were collected by diluting the reaction mixture with one volume of isopropyl alcohol followed by shredding of the coagulated polymer in a laboratory blender with fresh isopropyl alcohol, then heating with stirring at about 80° C. for 1 to 2 hours in isopropyl alcohol to complete catalyst removal, filtering off the polymer and vacuum drying. Table I below illustrates various conditions and various olefins polymerizations.

In the examples given below, the intrinsic viscosity was measured in decalin at 135° C. Intrinsic viscosity was determined according to F. W. Billmeyer, "Textbook of Polymer Chemistry," Interscience, New York, 1957.

The solubility of polypropylene was determined in boiling n-heptane using a laboratory extractor. Also, unless otherwise noted, the catalyst mole ratios are based on the metal.

Where indicated, physical measurements were determined according to ASTM procedures as follows: Melt Index, grams per 10 minutes: ATSM D–1238–62T at 230° C. and a load of 2160 grams; Flexural Stiffness, p.s.i.: ATSM D–790–61; Izod: ASTM D–256–56; and Brittleness Temperature, ° C.: ATSM D–746–57T. The weight percent of block copolymers or homopolymers sequentially incorporated onto homopolymers was determined by noting the amount of monomer or monomers fed to the reactor after adding the alkyl titanate.

*Example 1*

TABLE I

| Run No. | Monomer | Catalyst System | Catalyst, Mole Ratios | Rate, g./g. TiCl$_3$ per hr. | Intrinsic Viscosity | Percent Soluble |
|---|---|---|---|---|---|---|
| 1 | Propylene | 3TiCl$_3$·AlCl$_3$:DEAC [1] | 1:2 | 16 | 6.07 | 4 |
| 2 | do | Ti(OC$_4$)$_4$:3TiCl$_3$·AlCl$_3$:DEAC [2] | 0.5:1:2 | 27 | 3.71 | 47 |
| 3 | do | Ti(OC$_4$)$_4$:3TiCl$_3$·AlCl$_3$:DEAC | 0.25:1:2 | 23 | 3.77 | 43 |
| 4 | do | Ti(OC$_4$)$_4$:3TiCl$_3$·AlCl$_3$:DEAC | [3] 1:1:2 | | | |
| 5 | do | Ti(OC$_4$)$_4$:3TiCl$_3$·AlCl$_3$:DEAC [4] | 0.25:1:2 | 13 | 7.81 | 20 |
| 6 | do | Ti(OC$_8$)$_4$:3TiCl$_3$·AlCl$_3$:DEAC [5] | 0.5:1:2 | 19 | 4.49 | 44 |
| 7 | do | Ti(OC$_4$)$_4$:3TiCl$_3$·AlCl$_3$:TEA [6] | 0.25:1:4 | 73 | 4.1 | 29 |
| 8 | do | Ti(OC$_4$)$_4$:3TiCl$_3$·AlCl$_3$:TEA | 0.25:1:4 | 44 | 4.77 | 24 |
| 9 | do | Ti(OC$_8$)$_4$:3TiCl$_3$·AlCl$_3$:i-Bu$_2$AlH [7] | 0.5:1:2 | 40 | 2.3 | 64 |

[1] DEAC=Diethylaluminum monochloride.
[2] Ti(OC$_4$)$_4$=tetrabutyl titanate.
[3] Reaction died out after half an hour—with negligible formation of polymer.
[4] The order of addition of the catalyst system was: addition of titanate to TiCl$_3$ prior to addition of DEAC.
[5] Ti(OC$_8$)$_4$=tetraoctyl titanate.
[6] TEA=triethylaluminum. Reaction for 2 hours.
[7] Diisobutyl aluminum hydride. Reaction for 2.33 hours.

In the above, Run 1 illustrates a prior art method of polymerization of propylene at 65° C. to a high isotactic content polymer as evidenced by the percent heptane soluble figure of 4%. The high molecular weight, as evidenced by the intrinsic viscosity, should be noted, as well as the polymerization rate. Upon addition of a third component to the catalyst system of Run #1 consisting of tetrabutyl and tetraoctyl titanate, various observations can be made: First, the polymerization rate increased (Runs 2, 3, 6, 7, 8 and 9) while the isotactic content decreased (all runs except 5 which used a different order of addition of the catalyst); and secondly, there was a reduction in molecular weight of the polymer as evidenced by the intrinsic viscosity determinations (all runs except 5 which used a different order of addition of the catalyst).

The polypropylene produced in Runs 2, 3, 6, 7, 8 and 9 consisted of a large percentage of rubbery atactic polymer of reduced molecular weight, but no oily constituents.

It will be noted in Run 5 that when the tetra alkyl titanate is pre-reated with titanium trichloride and then with the aluminum compound, that the effect of reducing stereospecificity of the catalyst is not realized. It is preferred, therefore, to pre-react the titanium trichloride with the aluminum compound followed by the addition of the tetra alkyl titanate in polymerization systems where the partial rubbery polymer form is desired.

*Example 2*

TABLE II

| Run No. | Monomer | Catalyst System | Catalyst, Mole Ratios | Rate, g./g. TiCl₃ per hr. | Intrinsic Viscosity | Percent Soluble |
|---|---|---|---|---|---|---|
| 10 | Butene-1 | TiCl₃:DEAC | 1:2 | 21 | 2.26 | |
| 11 | do | Ti(OC₈)₄:TiCl₃:DEAC | 0.5:1:2 | 17 | 2.96 | 100 |

In the above, Run 10 was carried out according to the prior art at 65° C. The polymer produced contained from 70 to 80% isotactic content. By the catalyst of this invention a completely soluble (in cold xylene) atactic form is prepared as indicated in Run 11. This is a highly desirable method of preparing polybutene for special application in the field of elastomers.

*Example 3* dicated based on the total polymer, followed by addition of ethylene-propylene in the ratios indicated. The rate of polymerization for this series of runs is that for the copolymerization reaction.

Runs 16 through 19 above demonstrate the ability to prepare rubbery terpolymers of butene-1, ethylene and propylene which were soluble in boiling benzene up to 97% by first preparing a partial polymer of butene-1 and then adding by copolymerization, and ethylene-propylene rubber. It will be observed that there is an optimum range (6 to 12%) of polybutene for maximum polymer solubility and that a practical range of molecular weight is achieved without a chain transfer agent.

In the following examples, there is demonstrated the employment of the three-component catalyst in the sequential polymerization of propylene followed by polymerizing or copolymerizing onto the isotactic polymer formed rubbery polypropylene or an ethylene-propylene rubber copolymer.

*Example 5*

In a two liter reaction vessel there was added in hep-

TABLE III

| Run No. | Monomers (1:1 Mole Ratio) | Weight Percent Propylene in Polymer | Catalyst System | Catalyst, Mole Ratios | Rate, g./g. TiCl₃/hr. | Intrinsic Viscosity | Percent Soluble |
|---|---|---|---|---|---|---|---|
| 12 | Ethylene-Propylene | | HA:TEA [1] | 1:2.3 | [2] 49 | 0.58 | 83 |
| 13 | do | 42 | Ti(OC₄)₄:TiCl₃:DEAC | 0.5:1:2 | 25 | 3.05 | 90 |
| 14 | do | | Ti(OC₈)₄:TiCl₃:DEAC | 0.5:1:2 | 22 | | 90 |

[1] HA = Hydrogen reduced TiCl₄.
[2] 40° C.

The above runs demonstrate the preparation of ethylene-propylene copolymer rubbers by the process of this invention. Run 12 shows a prior art reaction wherein solubility of the copolymer was measured in cold benzene. Runs 13 and 14 were carried out according to the process herein and solubility of the copolymers was measured in cold xylene.

A high amorphous content type ethylene-propylene rubber is obtained by the three-component catalysts herein having an intrinsic viscosity which renders the copolymer suitable for application in the elastomeric field.

*Example 4* tane 2.0 grams of titanium trichloride and 2.56 grams of diethylaluminum monochloride (Ti/Al ratio 1:2). The catalyst was pre-reacted by heating it for 15 minutes at 60° C.; following this, propylene monomer was then introduced to the reaction vessel and polymerized for two hours. Tetraoctyl titanate in an amount of 1.76 grams (total catalyst based on tetraoctyl titanate:titanium trichloride:diethylaluminum monochloride:0.5:1:2) was then added. After the addition of the tetraoctyl titanate, the reaction was continued for two hours by the continued addition of propylene monomer. When the tetraoctyl titanate was added to the reaction, the catalyst color

TABLE IV

| Run No. | Percent Polybutene Prepolymer | Monomers (1:1 Mole Ratio) | Catalyst System | Catalyst, Mole Ratios | Rate, g./g. TiCl₃/hr. | Intrinsic Viscosity | Percent Solubles |
|---|---|---|---|---|---|---|---|
| 15 | | Ethylene-butene | Ti(OC₈)₄:TiCl₃:DEAC | 0.5:1:2 | 18 | | 87 |
| 16 | 19 | Ethylene-propylene | Ti(OC₈)₄:TiCl₃:DEAC | 0.5:1:2 | 21 | 3.8 | 91 |
| 17 | 11.5 | do | Ti(OC₈)₄:TiCl₃:DEAC | 0.5:1:2 | 26 | 2.0 | 97 |
| 18 | 6.4 | do | Ti(OC₈)₄:TiCl₃:DEAC | 0.5:1:2 | 28 | 4.3 | 97 |
| 19 | 2.7 | do | Ti(OC₈)₄:TiCl₃:DEAC | 0.5:1:2 | 30 | 3.1 | 92 |

In Runs 16 through 19 above, butene-1 was first introduced to the reaction and polymerized to the percent inchanged from purple to brown. As the reaction progressed, the reaction mixture became more viscous. A total yield of 98 grams of polymer was obtained having an intrinsic viscosity of 6.04. The reaction was carried out in heptane and the temperature throughout was between 50 to 60° C.

Example 6

The procedure of Example 5 was followed, except that the tetraoctyl titanate was added in two increments. The first was added after the initial two hour reaction and then after one hour and 20 minutes, an additional amount of tetraoctyl titanate was added. The overall catalyst mole ratios based on tetraoctyl titanate:titanium trichloride:diethylaluminum monochloride were 2.3:1:4. The total yield of polymer was 115.5 grams having an intrinsic viscosity of 4.9.

Example 7

In this and the following examples, an ethylene-propylene copolymer rubber block was sequentially formed on polypropylene after formation of an initial high isotactic content polypropylene by the use of a titanium trichloride-diethylaluminum monochloride catalyst. The reactions were carried out in heptane at temperatures of from 50° to 60° C. and in all of these examples the titanium trichloride and diethylaluminum monochloride were first pre-treated at 60° C. for about 15 minutes.

In this example, after the initial pre-reaction of titanium trichloride and diethylaluminum monochloride at a mole ratio of 1:4, propylene was introduced and polymerized for a period of two hours. After this period, tetraoctyl titanate was added in a mole ratio, based on the three components (tetraoctyl titanate:titanium trichloride:diethylaluminum monochloride), of 1:1:4. Upon addition of the tetraoctyl titanate and the introduction of a comonomer feed based on a 1:1 molar ratio of ethylene and propylene, a tremendous increase in the polymerization rate occurred and the monomer mixture was initially absorbed completely. The feed was stopped after 10 minutes, but reaction was continued for an additional 20 minutes to observe the duration of the rate increase. A maximum polymerization rate was observed after 15 minutes, followed by a sharp decrease. The maximum polymerization rate was calculated as 115 grams of polymer per gram of titanium trichloride per hour. In this example, 10% by weight of an ethylene-propylene rubber was incorporated onto the isotactic polypropylene.

Example 8

A further run wherein 10% ethylene-propylene rubber was also sequentially polymerized onto polypropylene was carried out under substantially identical conditions as above. A total yield after a period of 2 hours was 113.6 grams and the polymer had an intrinsic viscosity of 4.99.

Example 9

In this example, the same catalyst mole ratios as above were employed and 20% ethylene-propylene rubber was sequentially polymerized onto the pre-formed isotactic polypropylene chain. The initial propylene run was carried out for 3 hours, after which the tetraoctyl titanate was added and a comonomer mixture of ethylene and propylene in a 1:1 molar ratio. There was obtained a yield of 170.4 grams with an intrinsic viscosity of 6.02.

Typical physical properties of some of the foregoing modified polypropylene polymers are as follows.

The excellent low temperature brittleness properties, particularly of those block copolymers of Examples 8 and 9 are to be noted.

Modifications falling within the spirit of this invention and the scope of the appended claims can be made to the process herein.

What is claimed is:

1. A process for polymerizing an alpha-olefin to a rubbery polymer which comprises reacting said alpha-olefin with catalytic quantities of a catalyst complex prepared by admixing (1) a Ti(OR)$_4$, wherein R is an alkyl group containing from 2 to 10 carbon atoms, and the prereaction product of (2) a crystalline titanium trichloride cocrystallized with aluminum chloride with (3) an aluminum compound selected from the group consisting of aluminum trialkyl, dialkyl aluminum monochloride and dialkyl aluminum monohydride, the molar ratio of components (1), (2) and (3) in the final catalyst product being 0.25 to 1:1:1 to 8, respectively, in a reaction zone in the presence of a hydrocarbon diluent at a temperature of about 40° to 100° C. and a pressure of at least 1 atmosphere and recovering from the reaction zone a polymer product having a lower crystallinity as indicated by a higher amount of the polymer which is soluble in boiling n-heptane than the polymer products obtained from processes using the catalyst components (1), (2) and (3) which are added simultaneously to said reaction zone.

2. The process of claim 1 wherein the titanium trichloride is cocrystallized with aluminum chloride in accordance with the formula $n\text{TiCl}_3 \cdot \text{AlCl}_3$ and wherein $n$ is a digit of from 1 to 5 and the olefin polymerized is propylene.

3. The process of claim 2 wherein the titanium trichloride is cocrystallized with aluminum chloride in accordance with the formula $3\text{TiCl}_3 \cdot \text{AlCl}_3$.

4. The process of claim 1 wherein the Ti(OR)$_4$ is tetrabutyl titanate.

5. The process of claim 1 wherein the Ti(OR)$_4$ is tetraoctyl titanate.

6. The process of claim 1 wherein catalyst component (3) is aluminum triethyl.

7. The process of claim 1 wherein catalyst component (3) is diethyl aluminum monochloride.

8. The process of claim 1 wherein catalyst component (3) is diisobutyl aluminum monohydride.

9. A process for polymerizing butene-1 to a rubbery polymer which comprises reacting said butene-1 with catalytic quantities of a catalyst complex prepared by admixing (1) a Ti(OR)$_4$, wherein R is an alkyl group containing from 2 to 10 carbon atoms, and the prereaction product of (2) a crystalline titanium trichloride cocrystallized with aluminum chloride in accordance with the formula $n\text{TiCl}_3 \cdot \text{AlCl}_3$, wherein $n$ is a digit of from 1 to 5, and (3) an aluminum compound selected from the group consisting of aluminum triethyl, diethyl aluminum monochloride and diisobutyl aluminum monohydride, the molar ratio of components (1), (2) and (3) in the final catalyst product being 0.25 to 1:1:1 to 8, respectively, in a reaction zone in the presence of a hydrocarbon diluent at a temperature of about 40° to 100° C. and a pressure of at least 1 atmosphere and recovering from the reaction zone a polymer product which is substantially completely amorphous as indicated by being 100 percent soluble in cold xylene.

TABLE V

| Example | Weight percent of Block | Melt Index | ASTM Flexural Stiffness, p.s.i. | Intrinsic Viscosity | Izod | ASTM Brittleness Temp., ° C. |
|---|---|---|---|---|---|---|
| 5 | 41 | 0.1 | 86,640 | 6.04 | 1.2 | +5 |
| 6 | 41 | 0.3 | 57,100 | 4.9 | 0.9 | +5 |
| 8 | 10 | 0.2 | 59,400 | 4.99 | 7.5 | −5 |
| 9 | 20 | 0.1 | 51,400 | 6.02 | 11.3 | −5 |

10. A process for polymerizing a combination of monomers selected from the group consisting of ethylene-propylene and ethylene-butene-1 to a rubbery copolymer which comprises reacting said combination of monomers with catalytic quantities of a catalyst complex prepared by admixing (1), a Ti(OR)$_4$, wherein R is an alkyl group containing from 2 to 10 carbon atoms, and the prereaction product of (2) a crystalline titanium trichloride cocrystallized with aluminum chloride in accordance with the formula $n$TiCl$_3 \cdot$AlCl$_3$, wherein $n$ is a digit of from 1 to 5, with (3) an aluminum compound selected from the group consisting of aluminum triethyl, diethyl aluminum monochloride and diisobutyl aluminum monohydride, the molar ratio of components (1), (2) and (3) in the final catalyst product being 0.25 to 1:1:1 to 8, respectively, in a reaction zone in the presence of a hydrocarbon diluent at a temperature of about 40° to 100° C. and a pressure of at least 1 atmosphere and recovering a highly amorphous copolymer which is substantially completely soluble in cold xylene.

11. A process for preparing a rubbery block copolymer by the sequential polymerization of a first alpha-olefin monomer to a solid rubbery prepolymer, followed by introduction of a combination of alpha-olefin monomers selected from either butene-1 and ethylene or propylene and ethylene, which comprises reacting said first alpha-olefin monomer with catalytic quantities of a catalyst complex prepared by admixing (1) a Ti(OR)$_4$, wherein R is an alkyl group containing from 2 to 10 carbon atoms, and the prereaction product of (2) a crystalline titanium trichloride cocrystallized with aluminum chloride in accordance with the formula $n$TiCl$_3 \cdot$AlCl$_3$, wherein $n$ is a digit of from 1 to 5, with (3) an aluminum compound selected from the group consisting of aluminum triethyl, diethyl aluminum monochloride and diisobutyl aluminum monohydride, the molar ratio of components (1), (2) and (3) in the final catalyst product being 0.25 to 1:1:1 to 8, respectively, in a reaction zone in the presence of a hydrocarbon diluent at a temperature of about 40° to 100° C. and a pressure of at least 1 atmosphere, introducing said combination of alpha-olefin monomers into said reaction zone, reacting said combination of monomers at said temperature and pressure and recovering from the reaction zone a rubbery block copolymer product which is substantially completely soluble in cold xylene.

12. The process of claim 11 wherein butene-1 is said first alpha-olefin monomer that is polymerized to said solid rubbery prepolymer and wherein said prepolymer comprises from 6 to 12 percent by weight of said rubbery block copolymer.

13. The process of claim 11 wherein the titanium trichloride is cocrystallized with aluminum chloride in accordance with the formula 3TiCl$_3 \cdot$AlCl$_3$.

14. The process of claim 11 wherein the Ti(OR)$_4$ is tetrabutyl titanate.

15. The process of claim 11 wherein the Ti(OR)$_4$ is tetraoctyl titanate.

References Cited

UNITED STATES PATENTS 3,073,811   1/1963   Natta et al. _____ 260—93.7

FOREIGN PATENTS 601,560   2/1960   Italy.
856,736   12/1960   Great Britain.

MURRAY TILLMAN, *Primary Examiner.*

D. J. BREZNER, *Assistant Examiner.*